United States Patent
Grosbois et al.

(10) Patent No.: US 9,636,755 B2
(45) Date of Patent: May 2, 2017

(54) TOOL FOR MACHINING A WALL OF A WORKPIECE, IN PARTICULAR MADE FROM A COMPOSITE MATERIAL

(71) Applicant: SNECMA, Paris (FR)

(72) Inventors: Christophe Grosbois, Combs la Ville (FR); Mathias Seve, Paris (FR)

(73) Assignee: SNECMA, Paris (FR)

( * ) Notice: Subject to any disclaimer, the term of this patent is extended or adjusted under 35 U.S.C. 154(b) by 131 days.

(21) Appl. No.: 14/369,797

(22) PCT Filed: Jan. 3, 2013

(86) PCT No.: PCT/FR2013/050012
§ 371 (c)(1),
(2) Date: Jun. 30, 2014

(87) PCT Pub. No.: WO2013/102736
PCT Pub. Date: Jul. 11, 2013

(65) Prior Publication Data
US 2014/0363246 A1    Dec. 11, 2014

(30) Foreign Application Priority Data

Jan. 5, 2012  (FR) ...................................... 12 50136

(51) Int. Cl.
*B23G 5/06* (2006.01)
*B23B 51/02* (2006.01)
(Continued)

(52) U.S. Cl.
CPC .............. *B23B 51/02* (2013.01); *B23B 35/00* (2013.01); *B23G 1/38* (2013.01); *B23G 5/00* (2013.01);
(Continued)

(58) Field of Classification Search
CPC . B23G 1/38; B23G 5/00; B23G 5/005; B23G 2200/28; B23G 2200/32;
(Continued)

(56) References Cited

U.S. PATENT DOCUMENTS

| | | | | |
|---|---|---|---|---|
| 559,372 A | * | 5/1896 | Elterich | B23G 5/06 408/218 |
| 1,265,348 A | * | 5/1918 | Lloyd | B23G 5/06 33/555.2 |

(Continued)

FOREIGN PATENT DOCUMENTS

| CN | 1753751 A | 3/2006 |
|---|---|---|
| CN | 1754641 A | 4/2006 |

(Continued)

OTHER PUBLICATIONS

International Search Report Issued Apr. 23, 2013 in PCT/FR13/050012 Filed Jan. 3, 2013.

*Primary Examiner* — Eric A Gates
*Assistant Examiner* — Paul M Janeski
(74) *Attorney, Agent, or Firm* — Oblon, McClelland, Maier & Neustadt, L.L.P.

(57) ABSTRACT

A tool for machining a wall of a workpiece, made from a composite material, that can cut a groove in the wall, the tool including a head mounted integrally with a rod having a longitudinal axis and capable of being driven in rotation about the longitudinal axis. The head includes at least one main protruding annular rib with an outer surface covered with abrasive grains of predetermined particle size and with a radial height corresponding to the depth of the groove to be cut, and at least one auxiliary protruding annular rib with an outer surface covered with abrasive grains of predetermined particle size and with a radial height less than the radial height of a main rib. The auxiliary rib includes two (Continued)

circular ridges separated by a ring band that is flat and that can be conical in shape.

13 Claims, 2 Drawing Sheets

(51) Int. Cl.
    *B23G 1/38*     (2006.01)
    *B23G 5/00*     (2006.01)
    *B23B 35/00*     (2006.01)

(52) U.S. Cl.
    CPC ........ *B23G 5/005* (2013.01); *B23B 2220/123* (2013.01); *B23B 2251/08* (2013.01); *B23C 2226/27* (2013.01); *B23G 2200/28* (2013.01); *B23G 2200/32* (2013.01); *Y10T 408/03* (2015.01); *Y10T 408/907* (2015.01); *Y10T 408/9048* (2015.01)

(58) Field of Classification Search
    CPC ...... B23G 5/06; B23G 5/062; B23C 2226/27; Y10T 408/03; Y10T 408/907; B23B 35/00; B23B 51/02; B23B 2220/123; B23B 2251/08
    See application file for complete search history.

(56) References Cited

U.S. PATENT DOCUMENTS

| | | | | |
|---|---|---|---|---|
| 1,770,585 A * | 7/1930 | Steinruck | ................ | B23G 5/06 408/218 |
| 1,912,517 A * | 6/1933 | De Lapotterie | ......... | B23G 5/06 470/198 |
| 2,179,157 A * | 11/1939 | MacDonald | ............. | B23G 5/06 408/1 R |
| 2,202,236 A * | 5/1940 | Stimson | ................... | B23G 5/06 408/222 |
| 2,703,419 A * | 3/1955 | Barth | ....................... | B21H 7/10 29/523 |
| 4,181,457 A * | 1/1980 | Holmes | .................... | B23G 5/06 408/217 |
| 5,435,786 A | 7/1995 | Murphy | | |
| 5,678,962 A * | 10/1997 | Hyatt | .................... | B23G 5/188 408/222 |
| 6,012,882 A * | 1/2000 | Turchan | ................. | B23G 5/188 408/222 |
| 7,073,988 B2 * | 7/2006 | Giessler | ................ | B23G 5/005 408/222 |
| 7,357,606 B1 * | 4/2008 | Pettit | ....................... | B23G 5/20 408/1 R |
| 2003/0049081 A1 * | 3/2003 | Chapel | ................... | B23G 5/005 408/1 R |
| 2004/0170482 A1 * | 9/2004 | Henderer | ................ | B23G 5/06 408/222 |
| 2010/0329803 A1 * | 12/2010 | Strom | .................... | B23G 5/062 408/1 R |
| 2012/0107063 A1 * | 5/2012 | Norimatsu | ............... | B23G 7/02 408/199 |

FOREIGN PATENT DOCUMENTS

| | | |
|---|---|---|
| DE | 10 2005 042 409 | 3/2006 |
| JP | 10 43943 | 2/1998 |
| WO | 92 04997 | 4/1992 |

* cited by examiner

TOOL FOR MACHINING A WALL OF A WORKPIECE, IN PARTICULAR MADE FROM A COMPOSITE MATERIAL

BACKGROUND OF THE INVENTION

Field of the Invention

The present invention relates to the machining of workpieces made from a composite material. Although particularly suited to the machining of workpieces made from a composite material (and, in particular, those having an organic matrix, also termed OMC materials), the present invention is however not limited to this application and could just as well be employed for the machining of workpieces made from a metallic, plastic or any other material.

Description of the Related Art

It is known that turbo-engines of modern aircraft increasingly comprise parts made from OMC materials (for example compressor retention casings, the fan casing, etc.) which are chosen for their strength and light weight. Indeed, OMC materials make it possible to obtain workpieces of complex shape having small surfaces and dimensions.

As is known, OMC materials are formed with the aid of fibrous preforms having a two-dimensional or three-dimensional structure and an epoxy resin. The fibrous preforms, once produced, are introduced into a mold into which the resin is injected. Heating the mold in an oven then permits the polymerization of the resin and the formation of the OMC materials.

However, OMC materials, whether they have a two-dimensional or a three-dimensional structure, remain difficult to machine and are vulnerable to delamination and to fibers being torn out. Thus, certain machining operations (for example drilling and tapping) are not advised, or are even forbidden, when they break the continuity of the fibers and risk weakening the mechanical strength of the workpieces.

However, in the case of a compressor casing of a turbo-engine, a number of accessories must be mounted on the body of said casing. Holding the accessories requires attachment plates to be installed, these plates being, in the case of a metal casing, held on the body either by drilling and riveting or by tapping and screwing.

As drilling and tapping are not recommended, turbo-engine designers have therefore had to develop solutions either to find a way around the inability of OMC materials to withstand such machining operations, or to compensate for the weakening of the structure of an OMC workpiece after machining.

Thus, a known solution consists in embedding metal inserts when forming the fibrous preform. The inserts are then held by the fibers of the polymerized OMC material and no contraindicated machining operation is then necessary.

However, such a solution is an option only for workpieces made of OMC material having a two-dimensional structure. It is, indeed, very difficult to carry out in the case of large workpieces which are woven in three dimensions and are of complex shape. Integrating metal inserts when weaving the fibers is made difficult, even impossible, as a consequence of the size and volume of the workpieces, and as a consequence of the considerable swelling of the fibers in the preform.

Therefore, in order to compensate for this drawback, and such that the workpieces can be machined (in particular drilled and tapped), it is known to strengthen the OMC workpiece by means of an increase in material close to the holes which are to be drilled. This distributes the forces acting around the drilled—and possibly tapped—holes, which reduces the risk of the workpiece failing once the attachment plates are riveted or screwed.

However, strengthening in this manner by adding material causes a significant increase in mass, which cannot be satisfactory in the context of attempting to reduce the weight of a turbo-engine.

Furthermore, in order to tap the holes drilled in an OMC workpiece, it is current practice to use taps (for example HSS—High Speed Steel—or carbide) which comprise cutting teeth.

However, apart from wearing extremely quickly, the cutting teeth of taps of this type generate significant cutting forces on the OMC materials, which causes, in particular:
deformation of the OMC workpiece;
heating of the resin of the OMC material;
delaminations of the OMC material in the vicinity of the hole; and
breakage of the fibers of the OMC material.

Such machining defects, amplified with the fineness of the pitch of the tapping, affect the integrity of the OMC material forming the workpiece to be machined. It is therefore impossible to guarantee the material health of the latter.

In other words, tapping a hole in an OMC workpiece, by using taps having cutting teeth, causes a prejudicial weakening of its mechanical structure and thus of its resistance to forces when in use, once mounted.

Moreover, machining tools are known which comprise projecting annular ribs whose outer surface is covered with abrasive grains and whose radial height changes so as to facilitate the cutting of the furrows. It is thereby possible to proceed in a progressive manner for the cutting of the furrows, the ribs of lesser height providing a first stage in the tapping. Nonetheless, these tools, described in Japanese patent JP 10043943, can remove only small volumes of shavings during their passage in the hole to be tapped and it is necessary to carry out multiple passes in order to cut the shape of the threads.

BRIEF SUMMARY OF THE INVENTION

It is an object of the present invention to remedy these drawbacks and, in particular, to permit tapping in a single pass, or at least in a small number of passes, of holes drilled in a workpiece made from a composite material (in particular one having an organic matrix) without altering its mechanical strength.

To that end, according to the invention, the tool for machining a wall of a workpiece, in particular made from a composite material, designed to cut a furrow in said wall, said tool comprising a head securely mounted on a stem of longitudinal axis L-L which can be driven in rotation about the latter, said head comprising at least one main projecting annular rib whose outer surface is covered with abrasive grains of predetermined grain size and whose radial height corresponds to the depth of said furrow to be cut, and at least one auxiliary projecting annular rib whose outer surface is covered with abrasive grains of predetermined grain size and whose radial height is less than the radial height of a main rib, is noteworthy in that said auxiliary rib comprises two circular edges separated by an annular band which is flat, that is to say a revolved shape having a straight generatrix, and more particularly conical.

Thus, by means of the machining tool of the invention, tapping a hole created in the thickness of a workpiece made from a composite material (for example one having an organic matrix) is carried out by abrading said material by means of the rib or ribs of the rotating tool, such that no delamination or degradation of the resin forming the OMC material is observed. The outer surface of the furrow cut by the rib or ribs—defining a helical thread in the case of a tapping—is uniform, regular and clean. There is no or almost no tearing of fibers since the machining tool has no cutting teeth. Moreover, the machining tool of the invention requires less application force in comparison with that required when employing the known taps or thread milling cutters, which extends its useful life and thus reduces machining costs. The mechanical strength of the machined workpiece, subjected to significant forces, may thus be ensured without having recourse to external strengthening elements (cup, washer, etc.) or to an increase of material. The material health of the workpiece machined in this manner is ensured.

The flat outer surface of the annular band thus makes it possible to have a large surface area, covered with abrasive grains, for entering into contact with the composite material. This large surface area makes it possible to remove large volumes of shavings on each pass of the tool and thus to produce, more quickly, a first stage of the tapping threads by means of the secondary ribs. By virtue of the action of this surface, the number of passes necessary for the creation is then reduced and, in practice, a single pass is generally sufficient for tapping a hole in composite material.

It will be understood that, although it is particularly suited to tapping holes, the machining tool of the invention may equally be employed for threading the outer wall of a workpiece or even, more generally, for producing a helical furrow or multiple parallel furrows in a workpiece.

In one embodiment in accordance with the invention, the machining tool comprises a plurality of mutually parallel main projecting annular ribs, preferably between two and six, which define grooves between them.

In particular, for cutting a furrow of a given pitch, the main ribs are advantageously regularly spaced from one another, such that the pitch of the main ribs is equal to the pitch of the furrow.

Thus, when it comprises only identical main ribs, the machining head is cylindrical in shape. In this case, the tapping of a cylindrical hole may be performed by employing a helical interpolation of the machining tool and may require multiple passes of said tool against the wall in order to cut the final furrow which defines the helical thread.

In particular, the machining tool of the invention may comprise a plurality of mutually parallel auxiliary projecting annular ribs, preferably between two and five, which define grooves between them and in which the radial height decreases regularly from the maximum radial height associated with a main rib which is adjacent thereto, such that the radial ends of the auxiliary ribs and of the adjacent main rib are aligned along a straight line which is inclined with respect to the axis L-L and belongs to an axial plane passing through this axis L-L. In other words, the depth of the grooves between the auxiliary ribs decreases equally as one moves away from the adjacent main rib. This ensures, in particular, a progressive distribution of the material engagement in each groove formed by the auxiliary ribs.

Two configurations can then be envisaged:
  in a first configuration, the head of the tool comprises just a single main rib and a plurality of auxiliary ribs defined in the aforementioned manner such that the machining head has a frustoconical shape; and
  in a second configuration, the head of the tool comprises a plurality of main ribs and a plurality of auxiliary ribs. The head of the tool thus comprises a cylindrical portion, formed by the main ribs, and a frustoconical portion, defined by the auxiliary ribs.

The annular band is preferably aligned with said straight line which is inclined with respect to the axis L-L, the separation between two circular edges of a single auxiliary rib thus increasing as one approaches the longitudinal end of the head. This facilitates the rough working of the threads by means of the flat surface of the secondary ribs, the first ones of which to attack the composite material have a larger surface area than the subsequent ones. Since the rough working carried out by the first secondary ribs is more efficient, in terms of the size of the shavings removed, than that carried out by the tools of the prior art, the number of passes necessary in order to obtain the desired tapping is reduced.

Moreover, in order to cut a furrow of a given pitch, the main rib or ribs and the auxiliary ribs are advantageously regularly spaced from one another, such that the pitch of said ribs is equal to the pitch of the furrow.

Whatever the aforementioned configuration envisaged, the nature of the auxiliary ribs makes it possible to cut, progressively, the first stage of a furrow in the wall, by attacking it preferably by means of the auxiliary rib having the smallest height, this first stage then being shaped by means of the main rib or ribs in order to obtain the definitive furrow. In the case of a cylindrical hole formed in a workpiece, the tapping operation may be performed with the aid of a single helical interpolation of the machining tool (that is to say by means of a single pass of the latter), reducing the machining time and wear of the tool.

Moreover, in this other embodiment, there is:
  either the main rib or ribs arranged at the longitudinal end of said tool.

Such an arrangement is, for example, suited to tapping a through hole, employing a helical interpolation with raising of the machining tool along the wall of the hole;
  or the auxiliary rib or ribs arranged at the longitudinal end of said tool, such that the auxiliary rib having the smallest radial height is positioned at this longitudinal end. Such an arrangement is in particular suited to tapping a blind hole or a through hole, employing a helical interpolation with lowering of the machining tool along the wall of the hole.

Furthermore, the abrasive grains associated with a main annular rib have a grain size (for example between 46 µm and 91 µm) which is smaller than the grain size of the abrasive grains associated with an auxiliary rib (for example between 107 µm and 427 µm).

Thus, the auxiliary rib or ribs make it possible to cut a first stage of the furrow which is subsequently shaped by means of the main rib or ribs in order to obtain the definitive furrow.

Of course, as a variant, the abrasive grains associated with a main annular rib could have a grain size at least equal to that of the abrasive grains associated with an auxiliary rib.

It will be understood that the size of the abrasive grains may advantageously be chosen as a function of the dimensions of the rib in question, of the number of ribs and/or of the dimensions of the hole to be tapped.

In addition, the abrasive grains associated with a main rib and those associated with an auxiliary rib may be either of the same type or of different types.

The abrasive grains used within the scope of the invention may advantageously be of diamond, either natural or synthetic, or of cubic boron nitride.

Furthermore, the abrasive grains may be positioned on the outer surface of the main and auxiliary ribs during an electroplating operation.

Moreover, the machining tool of the invention may comprise at least one internal duct for the supply of fluid, either lubricant or coolant, which is created in the head of the tool and opens laterally via at least one discharge opening.

Alternatively or in addition, the machining tool of the invention may comprise at least one preferably helical groove for the supply of fluid.

Furthermore, the present invention also relates to a method for tapping a workpiece made from a composite material comprising at least one cylindrical hole, characterized in that it employs a machining tool as described hereinabove.

BRIEF DESCRIPTION OF THE SEVERAL VIEWS OF THE DRAWINGS

The figures of the appended drawing will make clear how the invention may be realized. In these figures, identical references designate similar elements.

DETAILED DESCRIPTION OF THE INVENTION

Figure 1:
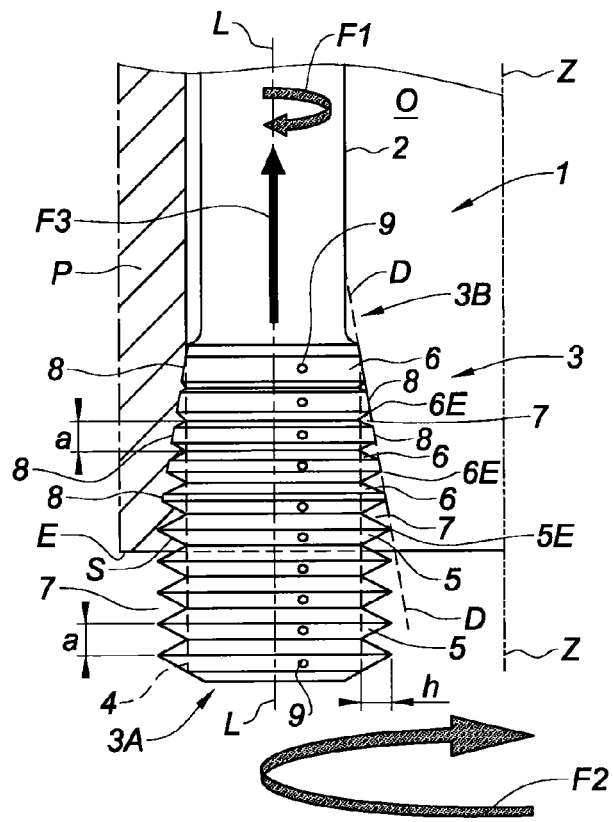
FIG. 1 represents schematically, in a profile view, a first exemplary embodiment of a machining tool in accordance with the present invention.
Figure 2:
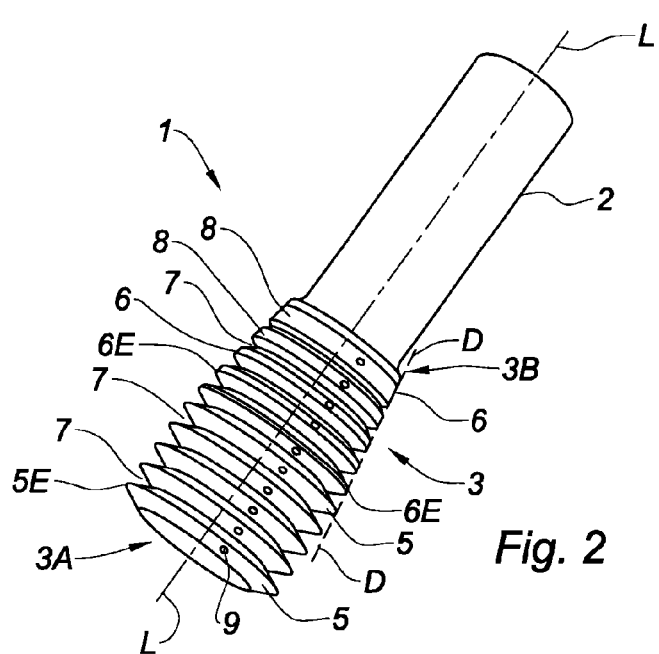
FIG. 2 is a schematic perspective view of the tool of FIG. 1.

FIGS. 1 and 2 show a first exemplary embodiment of a machining tool 1, in accordance with the present invention, which is used to tap a cylindrical hole O (partially represented)—of longitudinal axis Z-Z drilled in a workpiece made from an OMC material—by cutting a helical furrow S of a given pitch a in the wall P of the hole O.

Although it is particularly suited to machining a workpiece made from a composite material (and in particular made from an OMC material), it will be understood that the machining tool 1 may equally serve to machine workpieces formed from any other material (metal, plastic, etc.).

As shown in FIGS. 1 and 2, the machining tool 1 comprises:
  a stem 2 of longitudinal axis L-L which is designed to be attached, at one of its longitudinal ends, to a numerically controlled machine tool (not shown in the figures) which is able to rotate the stem about its axis L-L (this rotational movement being symbolized by the arrow F1); and
  a head 3 which is formed from a cylindrical body 4 and which is secured to the free longitudinal end of the stem 2. It will be noted that the stem 2 and the head 3 may be distinct or, on the contrary, form a single part.

According to this first example, the head 3 comprises ten projecting annular ribs 5 and 6—the outer surface of which is covered with abrasive grains deposited by electroplating—which each belong to a plane orthogonal to the axis L-L. The ribs 5 and 6 are mutually parallel and independent from one another.

The projecting ribs 5 and 6, defining, two by two, grooves 7, are regularly spaced from one another such that the associated pitch a is equal to the pitch of the helical furrow S to be cut in order to tap the hole O.

Among the ten projecting ribs 5 and 6, there are:
  five adjacent main ribs 5, whose radial height h corresponds to the depth of the helical furrow S; and
  five adjacent auxiliary ribs 6, whose radial height h is less than the radial height of a main rib 5. In other words, the radial height of an auxiliary rib 6 is less than the depth of the helical furrow S.

In addition, the main ribs 5 are arranged on the side of the free longitudinal end 3A of the head 3, whereas the auxiliary ribs 6 are next to the main ribs 5 and are positioned on the side of the longitudinal end 3B of the head 3, which is secured to the stem 2.

As shown in FIGS. 1 and 2, the radial height h of the auxiliary ribs 6 decreases regularly from the maximum radial height associated with the main rib 5 which is adjacent to the first auxiliary rib 6.

Thus, the radial ends 6E and 5E of the auxiliary ribs 6 and of the adjacent first main rib 5 are aligned along a straight line D-D which is inclined with respect to the axis L-L and which belongs to an axial plane passing through this axis L-L. The auxiliary ribs 6 and the first main rib 5 which is adjacent thereto then define a frustum, one generatrix of which is formed by the straight line D-D. In other words, by virtue of the main ribs 5 and the auxiliary ribs 6, the head 3 has a cylindrical portion (the main ribs 5) and a frustoconical portion (the auxiliary ribs 6).

While the main ribs 5 comprise just a single circular projecting edge at the radial end 5E, which is at a height h from the base of the corresponding rib, the auxiliary ribs 6 comprise two circular edges (one of which corresponds to the radial end 6E) each belonging to a generatrix D-D defining the frustum. The separation between two circular edges of a given auxiliary rib 6 is larger as one approaches the longitudinal end 3B of the head 3.

For each auxiliary rib 6, an annular band 8, whose corresponding lateral surface coincides with the surface of the frustum defined by the generatrix D-D, is defined between the two associated circular edges. This annular band having a flat outer surface (that is to say a revolved shape having a straight generatrix) therefore has a large surface area, covered with abrasive grains, which comes into contact with the composite material. This large surface area in contact with the wall of the hole to be tapped makes it possible, in comparison with the prior art, to remove large volumes of shavings on each pass of the tool and therefore to produce, more quickly, a first stage of the tapping threads by means of the secondary ribs. By virtue of the action of this surface, the number of passes necessary for the creation is then reduced and, in practice, a single pass is generally sufficient for tapping a hole in composite material.

In this example, the abrasive grains covering the outer surface of the main ribs 5 are smaller than the abrasive grains covering the outer surface of the auxiliary ribs 6.

By way of non-limiting numerical example, the grain size of the abrasive grains of the main ribs 5 may be between 46 μm and 91 μm and that of the abrasive grains of the auxiliary ribs 6 may be between 107 μm and 427 μm.

Thus, the auxiliary ribs 6 having large grains cut a first stage of the furrow S in the wall P of the hole O, which is then finished by means of the main ribs 5 having fine grains in order to obtain the definitive shape of the furrow S.

It will be noted that the abrasive grains of the main ribs 5 and those of the auxiliary ribs 6 are either of the same type or of different types.

Advantageously, the abrasive grains used within the scope of the invention may be made of diamond, either natural or synthetic, or made of cubic boron nitride. The coating binder which agglomerates these grains is, for example, metallic, made of resin or also of electroplated nickel.

Furthermore, the machining tool 1 may comprise one or more internal ducts (not shown) for the supply of fluid, either lubricant or coolant, which are created in the head 3 and open laterally via discharge openings 9.

Figure 3:
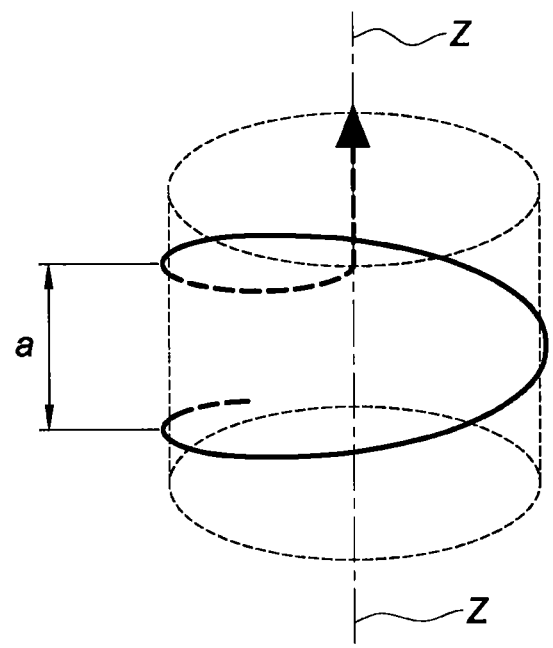
FIG. 3 shows an example of a trajectory associated with a helical interpolation followed by the longitudinal axis of the tool of FIG. 1, during an operation of tapping a hole.

In accordance with the invention, as shown in FIGS. 1 and 3, the operation of tapping, by means of the machining tool 1, the cylindrical hole O—formed in the wall P made from OMC material—may be carried out automatically with the aid of the numerically controlled machine which is capable of guiding the tool along a helical trajectory T. In this manner, the machining tool 1 carries out a helical interpolation.

A helical interpolation of this type is obtained by combining a circular movement (symbolized by the arrow F2) in a transverse plane which is orthogonal to the axis Z-Z with a simultaneous movement in translation (symbolized by the arrow F3) along an axis parallel to the axis Z-Z of the hole O.

In order to tap the hole O, the numerically controlled machine sets the tool 1 in rotation about itself (arrow F1), lowers the tool 1 along the axis Z-Z, offsets the axis L-L of the tool 1 with respect to the axis Z-Z of the hole O following a spiral motion in a plane which is transverse to the axis L-L, so as to bring the tool 1 against the inner wall P of the hole O which is to be tapped, and begins moving the tool 1 along the helical trajectory T (arrows F2 and F3).

When the axis L-L of the tool 1 completes a full rotation (i.e. 360°, the head 3 of the tool 1 carries out a movement, parallel to the axis Z-Z, equal to the length of the pitch of the furrow S to be cut and thus of the pitch of the ribs.

In the second exemplary embodiment of the machining tool in accordance with the invention, the auxiliary ribs 6 are now arranged at the longitudinal end 3A of the head 3 of the tool 1, such that the shortest auxiliary rib 6 is positioned at this longitudinal end 3A.

Figure 4:
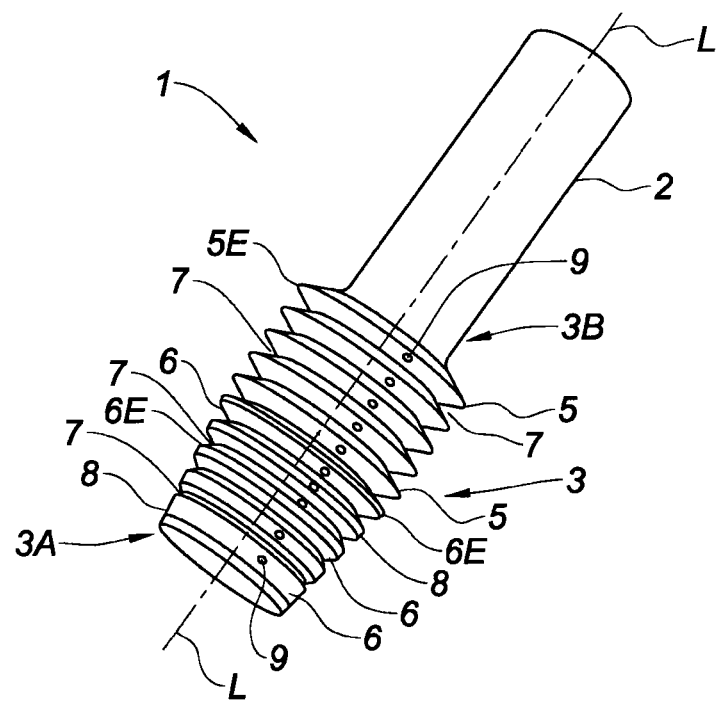
FIG. 4 shows, in a schematic perspective view, a second exemplary embodiment of a machining tool in accordance with the present invention.

Thus, if the machining tool 1 of the first example of FIGS. 1 and 2 is suited to tapping the through hole O by means of an operation of helical interpolation with raising of the machining tool 1 along the wall P of the hole O (symbolized by the arrow F3), the machining tool 1 of the second example of FIG. 4 is, for its part, suited to tapping a blind hole or a through hole O, employing a helical interpolation with lowering of the machining tool 1 along the wall P of said hole O.

Furthermore, although in the examples described the machining tool is used as a tapping tool, it will be understood from the above that it is equally suited for threading an outer wall of a workpiece or, in addition and more generally, for creating a helical furrow or multiple parallel furrows in a workpiece.

The invention claimed is:

1. A tool for machining a wall of a workpiece, or a workpiece made from a composite material, configured to cut a furrow in the wall, the tool comprising:
   a head securely mounted on a stem of a longitudinal axis that can be driven in rotation about the longitudinal axis, the head comprising
   main projecting annular ribs including an outer surface is covered with abrasive grains of predetermined grain size and a radial height of the main projecting annular ribs corresponds to a depth of the furrow to be cut, and
   at least a plurality of mutually parallel auxiliary projecting annular ribs that define grooves including an outer surface is covered with abrasive grains of predetermined grain size and a radial height of the auxiliary projecting annular ribs is less than the radial height of the main projecting annular ribs,
   wherein the auxiliary projecting annular ribs comprise two circular edges separated by an annular band that is flat, a separation between the two circular edges of a single auxiliary rib increasing on approaching a longitudinal end of the head,
   wherein the auxiliary projecting annular ribs form a frustoconical portion,
   wherein the main projecting annular ribs are closer to a free longitudinal end of the head than the auxiliary projecting annular ribs,
   wherein the frustoconical portion increases towards the free longitudinal end of the head, and
   wherein the radial height of the two ribs closest to the free longitudinal end of the head is a maximum value of the radial heights of the ribs.

2. The machining tool as claimed in claim 1, comprising between two and six mutually parallel main projecting annular ribs, which define grooves therebetween.

3. The machining tool as claimed in claim 2, for cutting a furrow of a given pitch, wherein the main ribs are regularly spaced from one another, such that a pitch of the main ribs is equal to a pitch of the furrow.

4. The machining tool as claimed in claim 1, wherein the radial height decreases regularly from a main projecting annular rib closest to the free longitudinal end of the head, such that radial ends of the auxiliary ribs and of an adjacent main rib are aligned along a straight line that is inclined with respect to the longitudinal axis and belongs to an axial plane passing through the longitudinal axis.

5. The machining tool as claimed in claim 4, wherein the annular band is aligned with the straight line.

6. The machining tool as claimed in claim 4, for cutting a furrow of a given pitch, wherein the main ribs and the auxiliary ribs are regularly spaced from one another, such that a pitch of the ribs is equal to a pitch of the furrow.

7. The machining tool as claimed in claim 4, wherein the abrasive grains associated with a main annular rib have a grain size, or a grain size between 46 μm and 91 μm, which is smaller than the grain size of the abrasive grains associated with an auxiliary rib, or between 107 μm and 427 μm.

8. The machining tool as claimed in claim 1, wherein the abrasive grains are made of diamond, natural or synthetic, or of cubic boron nitride.

9. The machining tool as claimed in claim 1, wherein the head comprises at least one internal duct for supplying fluid which opens laterally via discharge openings.

10. A method for tapping a workpiece made from a composite material comprising at least one cylindrical hole, the method comprising:
   providing the workpiece made from the composite material comprising the cylindrical hole;
   providing a tool, the tool including a head securely mounted on a stem of a longitudinal axis that can be driven in rotation about the longitudinal axis, the head comprising main projecting annular ribs including an outer surface is covered with abrasive grains of predetermined grain size and a radial height of the main projecting annular ribs corresponds to a depth of a furrow to be cut, and at least a plurality of mutually parallel auxiliary projecting annular ribs that define grooves including an outer surface is covered with abrasive grains of predetermined grain size and a radial height of the auxiliary projecting annular ribs is less than the radial height of the main projecting annular ribs, wherein the auxiliary projecting annular ribs comprise two circular edges separated by an annular band that is flat, a separation between the two circular edges of a single auxiliary rib increasing on approaching a longitudinal end of the head, wherein the main projecting annular ribs is closer to an end of the head than the auxiliary projecting annular ribs, and wherein the head is tapered such that a diameter of the head increases towards the end of the head and the radial height of the two ribs closest to the end of the head is a maximum value of the radial heights of the ribs; and tapping the hole of the workpiece using the tool to cut a furrow in the hole, the tool carrying out a helical interpolation by simultaneously moving circularly in a transverse plane orthogonal to an axis of the hole and moving in translation along an axis parallel to the axis of the hole, wherein the auxiliary projecting annular ribs are inserted into the hole before the main projecting annular rib.

11. A tool for machining a wall of a workpiece, or a workpiece made from a composite material, configured to cut a furrow in the wall, the tool comprising:

a head securely mounted on a stem of a longitudinal axis that can be driven in rotation about the longitudinal axis, the head comprising main projecting annular ribs including an outer surface is covered with abrasive grains of predetermined grain size and a radial height of the main projecting annular ribs corresponds to a depth of the furrow to be cut, and a plurality of mutually parallel auxiliary projecting annular ribs that define grooves including an outer surface is covered with abrasive grains of predetermined grain size and a radial height of the auxiliary projecting annular ribs is less than the radial height of the main projecting annular ribs, wherein the auxiliary projecting annular ribs comprise two circular edges separated by an annular band that is flat, a separation between the two circular edges of a single auxiliary rib increasing on approaching a longitudinal end of the head, wherein the auxiliary projecting annular ribs form a frustoconical portion, wherein the main projecting annular ribs are closer to a longitudinal end of the head opposite a free longitudinal end than the auxiliary projecting annular ribs, wherein the frustoconical portion is tapered towards said free longitudinal end of the head, wherein the radial height of the two ribs closest to said end of the head is a maximum value of the radial heights of the ribs, and wherein a spacing between the main annular projecting ribs is regular and a width of each of the main projecting ribs is the same.

12. The machining tool as claimed in claim 11, wherein the abrasive grains are made of diamond, natural or synthetic, or of cubic boron nitride.

13. The machining tool as claimed in claim 11, wherein the head comprises at least one internal duct for supplying fluid which opens laterally via discharge openings.

* * * * *